(No Model.)
L. HELD.
VALVE FOR PNEUMATIC TIRES.
No. 574,992. Patented Jan. 12, 1897.
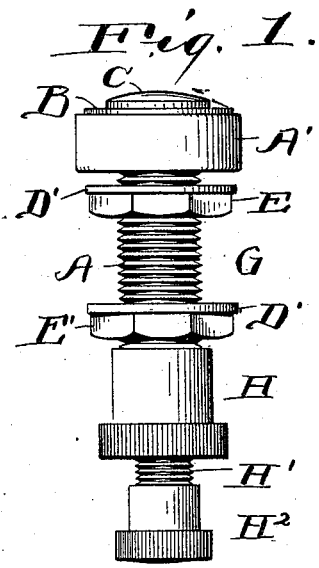
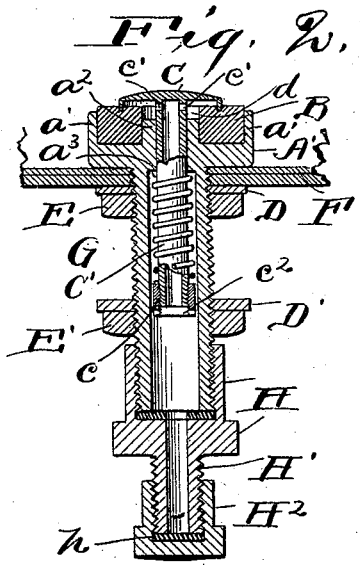
Witnesses.
E. B. Gilchrist
L. Ward Hoover.
Inventor:
Leonard Held
By
Leggett, Lynch, Doren & Donnelly
his attorneys.

UNITED STATES PATENT OFFICE.

LEONARD HELD, OF CLEVELAND, OHIO.

VALVE FOR PNEUMATIC TIRES.

SPECIFICATION forming part of Letters Patent No. 574,992, dated January 12, 1897.

Application filed January 2, 1896. Serial No. 574,025. (No model.)

*To all whom it may concern:*

Be it known that I, LEONARD HELD, of Cleveland, Cuyahoga county, Ohio, have invented certain new and useful Improvements in Valves for Pneumatic Tires; and I do hereby declare the following to be a full, clear, and exact description of the invention, such as will enable others skilled in the art to which it pertains to make and use the same.

My invention relates to valves to be used in connection with pneumatic tires such as are used on bicycles and other vehicle-wheels; and it consists in the peculiar construction of said valve and its mode of attachment to the wheel and tire, as will be more fully hereinafter described and claimed.

In the drawings, Figure 1 is a view in elevation of a valve embodying my invention. Fig. 2 is a longitudinal vertical section taken through Fig. 1, showing mode of attachment to the tire. Fig. 3 is a view in elevation, partly in section, showing more clearly the construction of the valve proper.

In the three figures above referred to I have shown the valve and its parts enlarged for the purpose of more clearly showing the construction and indicating the operation of the parts.

A designates a valve shank or casing which constitutes the means of attaching the valve to the tire and wheel, and at the same time acts as a means of containing and holding in position the operative parts of the device. The shank A, it will be noticed, is screw-threaded its entire length, excepting at its upper end, which is formed into a head A'. The head A' is preferably formed integral with the shank or casing A, and is provided at its upper face with two annular flanges $a'$ $a^2$, which form an annular recess that, in turn, constitutes a seat for an elastic annular gasket B. The gasket B is intended as a seat for the cup-shaped valve-head C, and, as shown in Fig. 2, the gasket B extends a short distance above both the annular flanges $a'$ and $a^2$.

It will be observed that in forming the two annular flanges at the upper end of the shank and in its head I form the inner flange somewhat lower than the outer flange and the elastic gasket, the object of which will be hereinafter more fully explained.

C represents a cup-shaped valve which is provided with a shank or stem C', the lower end of the stem being screw-threaded and provided with an adjusting-nut $c$. The stem C' is formed hollow and slides up and down in the casing A and its head A' through an orifice formed through the shank A and head A'. Beneath the head A' is formed a shoulder $a^3$, which acts as an abutment for the upper end of a spiral spring which encircles the stem C' between the adjusting-nut and the shoulder. It will thus be seen that as the adjusting-nut is screwed up or down upon the lower end of stem C' the tension of the spring is increased or decreased, as may be desired. On account of the lower orifice of casing or shank A being large, the nut $c$ at the lower end of the stem C' can be reached by means of a screw-driver which engages a slot $c^2$, provided in the lower end of said nut, by means of which it is adjusted. Washers or gaskets D D' are provided, which fit over the stem or casing A and act, in conjunction with nuts E E', as a means of attaching the valve to the pneumatic tube F and to the rim of the wheel, (not shown,) which occupies the space G when the valve is attached. At the lower end of stem A, I provide a cap H, with a reduced threaded shank H', said cap being internally screw-threaded at its upper end to engage the screw-thread upon shank A and externally screw-threaded at its reduced portion to engage a cap $H^2$, provided for the purpose of closing the lower end of the valve to keep dust and dirt out, and at the same time, if desired, by means of an elastic gasket $h$, to prevent any accidental leakage of air through the valve.

The operation of my device is as follows: An air-pump with nozzle or hose having screw-threads which engage either the lower end of the shank A or the reduced portion of the cap H' is attached to either place, as desired or necessary, the caps having previously been removed, and air is forced through the hollow space leading up through cap H to the lower portion of shank A or through the lower portion of shank A, thence through hollow stem C' of the valve proper, which acts, by its pressure, to force the said valve upward, the air escaping through small holes or apertures $c'$ $c'$, formed underneath the cup-shaped portion at the top of said valve and leading into the space $d$, formed by the upper end of the internal annular flange, the sides of the gasket, and the end portion of the cup-shaped valve C. It will thus be seen that as valve C is raised from its seat the air is distributed in a direction approximately at right angles to the valve-stem instead of in the form of a jet, and it will also be seen that, the upper end of the valve proper being convex or cup-shaped and the rubber gasket extending above the outer annular flange, there is less liability of the internal tube of the pneumatic tire being cut by any sharp corners if for any reason the tire should be punctured, and hence, being deflated, come in direct contact at its upper face with the upper edge of the valve, or, as between it and the road, the upper end of valve-stem C and the elastic gasket acting as a cushion.

What I claim is—

In a valve for pneumatic tires, the combination with a hollow casing, said casing being composed of a head and stem, the head being provided with an annular recess containing an elastic valve-seat, of a hollow-stemmed valve provided at its upper end with a head which engages the elastic valve-seat, and at its lower end a screw-thread and a nut which engages a spring for adjusting the tension of the valve, substantially as set forth.

In testimony whereof I sign this specification, in the presence of two witnesses, this 10th day of December, 1895.

LEONARD HELD.

Witnesses:
W. E. DONNELLY,
ELLA E. TILDEN.